United States Patent
So et al.

(10) Patent No.: US 7,841,186 B2
(45) Date of Patent: Nov. 30, 2010

(54) INLET BLEED HEAT AND POWER AUGMENTATION FOR A GAS TURBINE ENGINE

(75) Inventors: Peter So, San Francisco, CA (US); Jesse Sewell, Hobe Sound, FL (US); Donald Adams, Palm Beach Gardens, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 974 days.

(21) Appl. No.: 11/669,257

(22) Filed: Jan. 31, 2007

(65) Prior Publication Data

US 2008/0178571 A1    Jul. 31, 2008

(51) Int. Cl.
F02C 6/04    (2006.01)

(52) U.S. Cl. .............. 60/785; 60/782; 60/795

(58) Field of Classification Search ......... 60/782, 60/785, 795, 775, 39.3, 39.55
See application file for complete search history.

(56) References Cited

U.S. PATENT DOCUMENTS

| | | | |
|---|---|---|---|
| 3,705,491 A * | 12/1972 | Foster-Pegg | 60/39.55 |
| 3,747,336 A * | 7/1973 | Dibelius et al. | 60/39.55 |
| 4,157,010 A | 6/1979 | Sailer | |
| 4,214,435 A * | 7/1980 | Campbell | 60/775 |
| 5,163,282 A * | 11/1992 | Phillips et al. | 60/775 |
| 5,435,123 A * | 7/1995 | Scholl et al. | 60/775 |
| 5,540,045 A | 7/1996 | Corbett et al. | |
| 5,560,195 A | 10/1996 | Anderson et al. | |
| 5,720,164 A | 2/1998 | Corbett et al. | |
| 6,027,304 A | 2/2000 | Arar et al. | |
| 6,293,088 B1 * | 9/2001 | Moore et al. | 60/39.3 |
| 6,446,440 B1 | 9/2002 | Ranasinghe et al. | |
| 6,499,303 B1 | 12/2002 | Polukort et al. | |
| 6,526,758 B2 | 3/2003 | Ranasinghe et al. | |
| 6,534,234 B1 | 3/2003 | Naruse et al. | |
| 6,634,165 B2 * | 10/2003 | Tomlinson et al. | 60/39.3 |
| 6,685,425 B2 | 2/2004 | Poccia et al. | |
| 6,779,346 B2 | 8/2004 | Nichols et al. | |
| 6,901,761 B1 * | 6/2005 | Berkeley et al. | 60/782 |
| 7,353,655 B2 * | 4/2008 | Bolis et al. | 60/775 |
| 7,441,399 B2 * | 10/2008 | Utamura | 60/39.3 |
| 7,587,887 B2 * | 9/2009 | Horiuchi et al. | 60/39.3 |
| 2004/0221584 A1 * | 11/2004 | Hoffmann et al. | 60/782 |
| 2005/0097898 A1 * | 5/2005 | Yamanaka et al. | 60/782 |

* cited by examiner

*Primary Examiner*—William H Rodríguez
(74) *Attorney, Agent, or Firm*—Shook, Hardy & Bacon LLP

(57) ABSTRACT

An inlet bleed heat and power augmentation system utilizing a bi-directional and common piping arrangement is disclosed. The piping arrangement includes a plurality of feed tubes arranged to communicate either steam to a compressor discharge plenum or compressed air from the compressor discharge plenum. Various embodiments of the invention are discussed including operation methods.

24 Claims, 10 Drawing Sheets

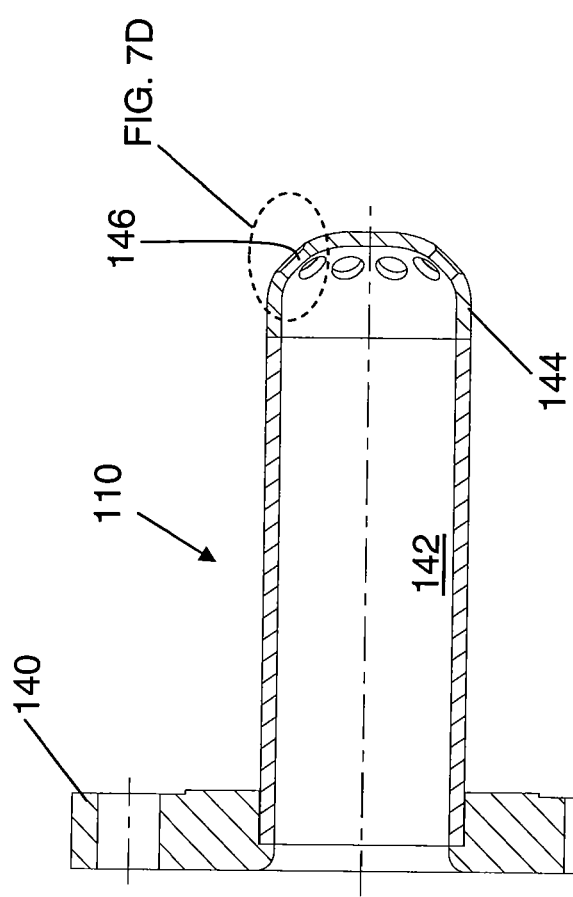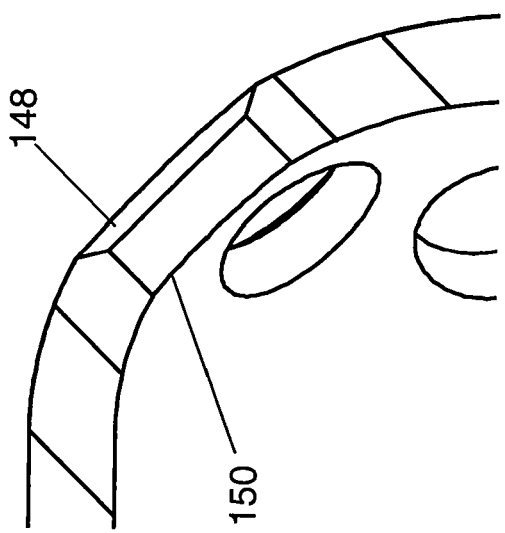

INLET BLEED HEAT AND POWER AUGMENTATION FOR A GAS TURBINE ENGINE

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates to gas turbine engines. More particularly, embodiments of the present invention relate to apparatus and method for increasing engine operational range and improving emissions of a gas turbine engine while simplifying the associated hardware.

BACKGROUND OF THE INVENTION

Gas turbine engines operate to produce mechanical work or thrust. Land-based gas turbine engines typically have a generator coupled thereto for the purposes to generating electricity. These generators apply a load to the engine. Land-based gas turbine engines have different modes of operation depending on the load applied to the engine. From an emissions and fuel consumption standpoint, land-based gas turbines are designed to operate most efficiently at a full power condition, also known as baseload, as that operating point is most common amongst users of land-based gas turbines. For example, a combustion system in a turbine operating at baseload would operate in a premix condition, where all fuel and air are mixed prior to ignition, thereby leading to a more complete burning of all fuel particles and lower emissions. However, when the power demand is lower, the load required by the generator on the engine is less, and therefore the engine is designed to operate at a lower power setting, so as to reduce fuel consumption. As such, typically the combustion process is different at lower settings (not optimal) and as a result, emissions are higher.

For instances in which the load on the engine is lower and the engine is not operating at full power, it is desirable, from an emissions standpoint, to provide conditions to the engine such that it believes it should be operating in a more efficient mode (premix). One system known in the art for accomplishing this is an inlet bleed heat (IBH) system.

An IBH system draws air from the compressor discharge plenum and directs it through a piping system to the engine air inlet, where it is injected into the inlet to mix with external air drawn into the engine inlet. Through this process, the addition of compressed air, which is at an elevated temperature (upwards of 800 deg. F.), elevates the temperature of the air entering the compressor and the combustor such that the reaction temperature in the combustor is high enough to keep the engine operating in a premix condition at a lower power setting. Normally, engines cannot drop below 75% load and maintain the more efficient premix combustion operation. However, by the addition of inlet bleed heat, this lower limit for premix operation can be extended down to approximately 50% load, depending on the air permit for the operating site.

When power demand is high and the gas turbine engine and associated generator are operating at 100% load, it is often desirable to obtain more power from the engine, and more megawatts (MW) from the generator. A second system, separate from the inlet bleed heat system, common to land-based gas turbines is a power augmentation (PAG) system. The PAG system directs steam from a steam source through a piping system and injects the steam into the air in the compressor discharge plenum. In the plenum, steam and air mix prior to passing through the combustor. The steam increases the mass flow of the fluid entering the combustor, such that additional work can be gained from the hot combustion gases by the turbine. This results in additional MW produced by the generator. When electricity prices are high, this can lead to increased revenue for the engine/generator operator.

Each of these systems are used to obtain greater performance from the gas turbine and generator. However, separate piping systems and controls are used for each of these systems, even though one system injects steam into the compressor discharge plenum and the other system draws air out of the compressor discharge plenum, at different engine conditions.

SUMMARY OF THE INVENTION

The present invention provides embodiments for a single piping system used for both inlet bleed heat and power augmentation operations for a gas turbine engine. In an embodiment of the present invention an inlet bleed heat and steam injection system is disclosed having a manifold and a plurality of feed pipes in fluid communication with the manifold and a compressor discharge plenum of the engine. A supply pipe is coupled to the manifold, a steam pipe, and an inlet pipe. The steam pipe is coupled to a steam source and includes valves for regulating and isolating the steam flow from the steam source to the supply pipe, manifold, and feed pipes. The inlet pipe is coupled to the engine inlet and includes valves for regulating the flow of compressed air from the compressor discharge plenum to the engine inlet.

In an additional embodiment, a gas turbine engine is disclosed having an inlet, a compressor, at least one combustor, a turbine, and a piping system for directing and controlling the flow of either steam to a compressor discharge plenum or compressed air from the compressor discharge plenum to the engine inlet.

In a further embodiment, a method of providing hot compressed air to a gas turbine engine inlet is disclosed. The method utilizes a gas turbine engine and piping system and ensures that steam flow is prevented from entering the supply pipe by closing control and isolation valves in the steam pipe. A control valve and isolation valve in the inlet air pipe are opened such that air from the compressor discharge plenum flows out of the plenum, through the feed pipes, through a control valve, to the manifold, and to the supply pipe. With the steam valves closed, and the valves in the inlet pipe open, the air is directed through the inlet pipe to the inlet of the engine. The air is injected into the inlet to mix with ambient air that is drawn into the inlet from outside the engine.

In yet another embodiment, a method of providing power augmentation to a gas turbine engine is disclosed. The power output of the engine is augmented by steam injection into the compressor discharge plenum. The method utilizes a gas turbine engine and piping system and ensures that inlet air flow is prevented from entering the supply pipe by closing control and isolation valves in the inlet pipe. A control valve and isolation valve in the steam pipe are opened such that steam from a steam source flows through the steam pipe to the supply pipe. With the inlet valves closed, and the valves in the steam pipe open, the steam is directed through the steam pipe, to the manifold, to the feed pipes, and to the compressor discharge plenum of the engine. The steam mixes with air from the compressor in the discharge plenum prior to being directed into the combustor.

In another embodiment, a bi-directional flowing nozzle for passing steam to the compressor discharge plenum or drawing air from the compressor discharge plenum is disclosed.

The nozzle comprises an end cap positioned proximate an end of a feed tube. A plurality of holes are arranged about the end cap, with the holes having a rounded edge on one side of the end cap and a sharp edge on the other. The sharp-edge hole opening is located on the side of steam flow from the feed tube and the rounded-edge hole opening is located on the side of air flow from the compressor discharge plenum. The different edge configurations allow for the proper amount of fluid, either air or steam, to flow through the holes and the nozzle.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWING

The present invention is described in detail below with reference to the attached drawing figures, wherein:

FIGS. 7A, 7B, 7C, and 7D depict views of a nozzle in accordance with an embodiment of the present invention;

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
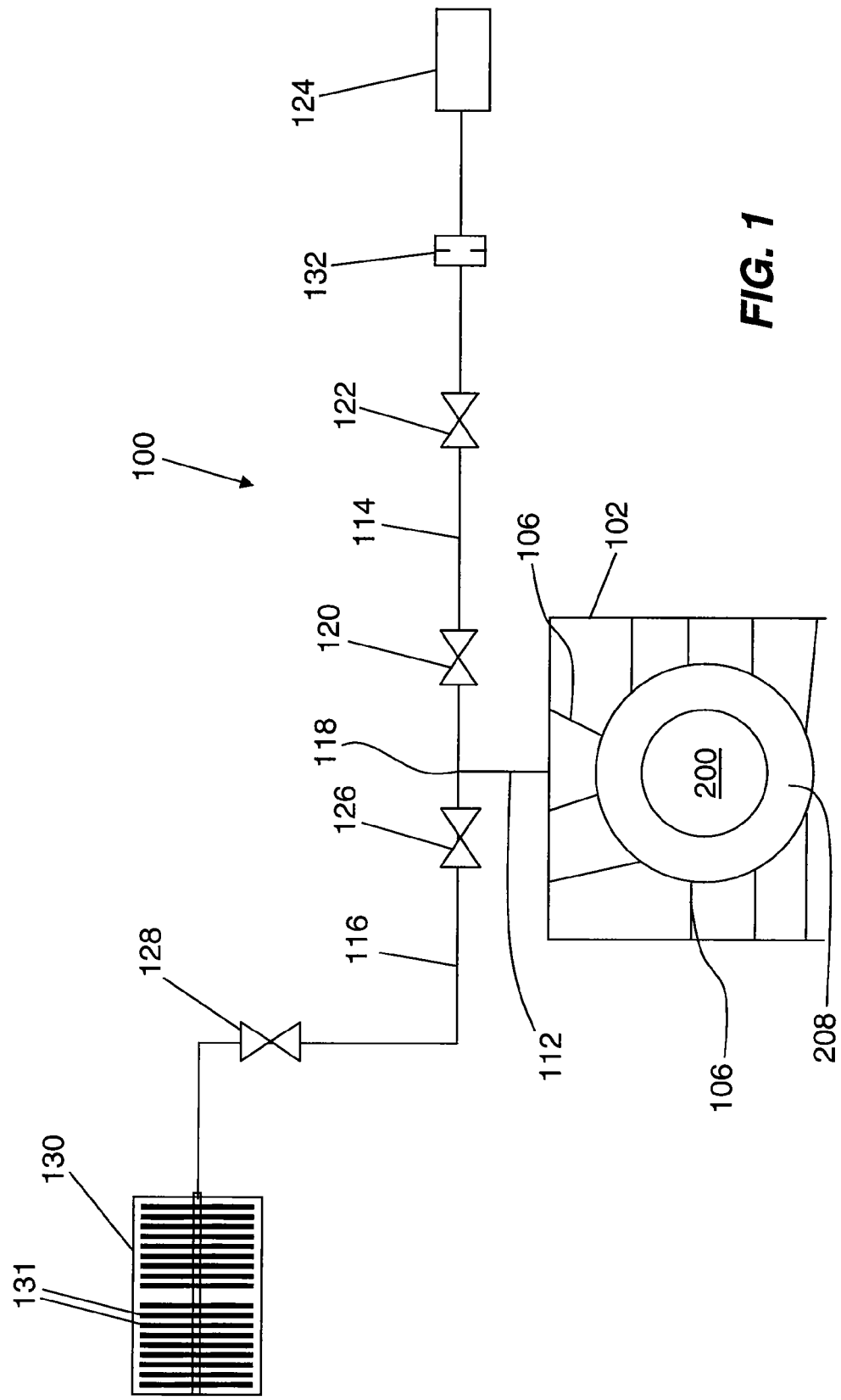
FIG. 1 depicts a schematic representation of a steam and air injection piping system in accordance with an embodiment of the present invention.

Referring now to FIG. 1, the present invention provides an embodiment of an inlet bleed heat and steam injection system 100 comprising a manifold 102 extending about at least a portion of a gas turbine engine 200. The manifold for the embodiment disclosed in FIG. 1 is generally U-shaped. A plurality of feed pipes 106 are in fluid communication with the manifold 102 as well as a compressor discharge plenum 208, which encompasses the core of engine 200. The feed pipes 106 are coupled to the discharge plenum 208 at a plurality of openings (not shown) that are generally equally spaced about the plenum 208. Furthermore, each of the feed pipes 106 contain a nozzle 110 (see FIGS. 3 and 7A-D for further detail on the nozzle 110) proximate the openings in the plenum 208.

Located adjacent to manifold 102 and in fluid communication with the manifold is a supply pipe 112. The supply pipe 112 is coupled to a steam pipe 114 and an inlet pipe 116 by a joint 118. This joint permits the flow of fluid between the supply pipe 112 and either of the steam pipe 114 or inlet pipe 116. The steam pipe 114 has a steam isolation valve 120, a steam control valve 122, and is in communication with a steam source 124. The inlet pipe 116, which is also coupled to the supply pipe 112, has an inlet bleed heat isolation valve 126, an inlet bleed heat control valve 128, and is in communication with an engine inlet 130. The isolation valves 120 and 126 are designed to be either fully open or fully closed, whereas the control valves 122 and 128 range between fully open to fully closed so as to regulate the amount of fluid flowing therethrough. The steam pipe 114 also includes an orifice plate 132 for measuring the flow of steam from the steam source 124.

Figure 2:
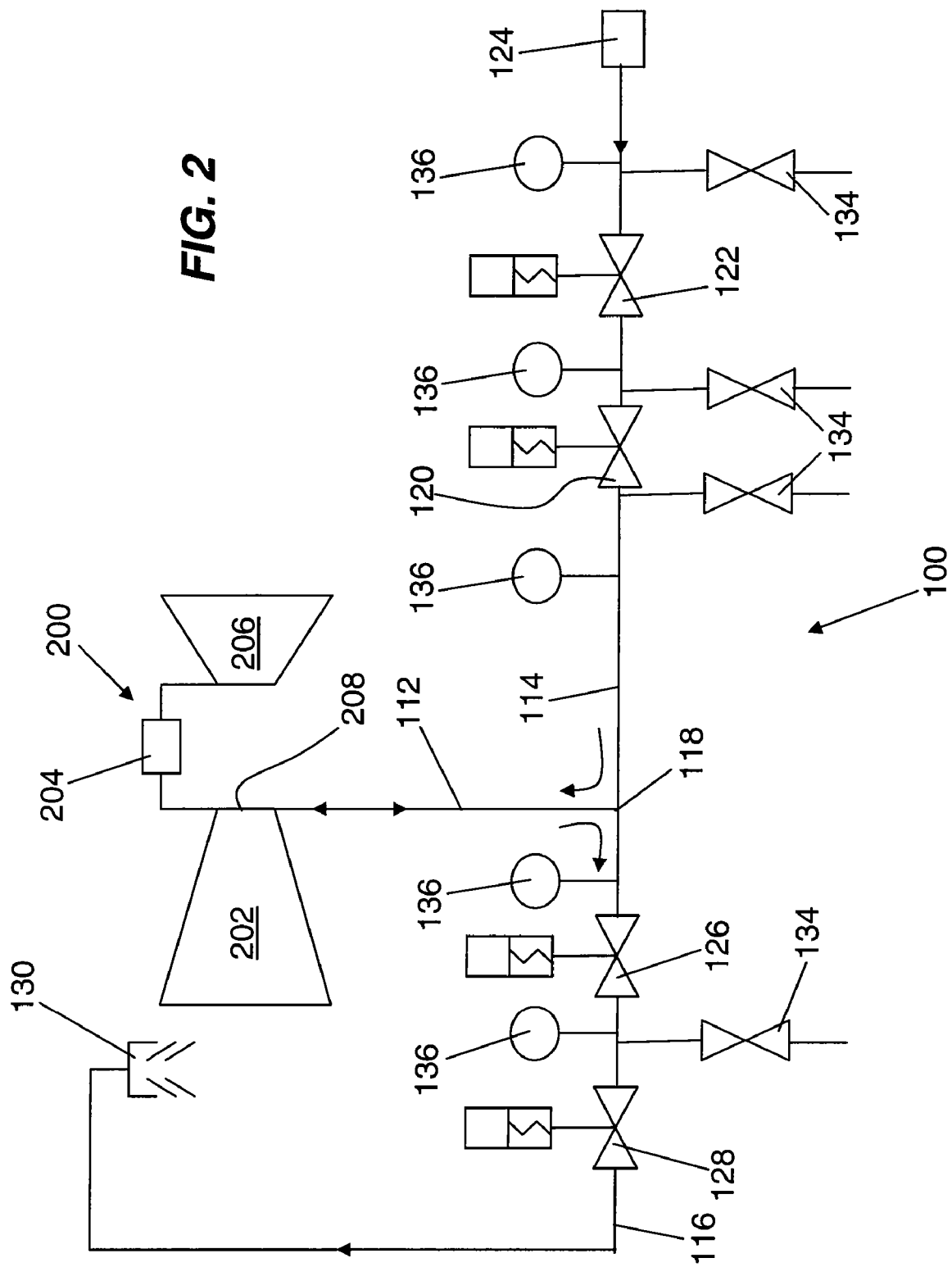
FIG. 2 depicts an alternate schematic representation of a steam and air injection piping system in accordance with an embodiment of the present invention.

A more detailed version of the embodiment of FIG. 1 is shown in FIG. 2. The embodiment of FIG. 2 shows the relation of inlet bleed heat and steam injection system 100 relative to a gas turbine engine 200. The supply pipe 112 is in fluid communication with a compressor discharge plenum 208 that receives compressed air from a compressor 202 and passes the fluid to at least one combustor 204. The hot combustion gases from the at least one combustor 204 passes to a turbine 206. Arrows in FIG. 2 indicate the flow direction of fluids to and from the compressor discharge plenum 208 of the engine 200.

The steam pipe 114 also comprises a plurality of drain valves 134 which can be opened to drain condensation that can form at different locations throughout steam pipe 114. A drain valve 134 is also positioned in inlet pipe 116. Also located in steam pipe 114 and inlet pipe 116 is at least one thermocouple 136. The thermocouples 136 are used to measure the temperature of the fluids contained in the pipes. It is important to know the temperature of the air being directed to the compressor inlet or the steam being directed to the compressor discharge plenum so that the proper amount of fluid can be regulated by the control valves for a given operating condition.

The inlet bleed heat and steam injection system 100 is configured so as to be able to flow two different fluid mediums, either to or from the engine, depending on the operating conditions and load to the engine. However, these fluids do not flow to or from the compressor discharge plenum 208 simultaneously, as will be discussed in more detail below. When steam is to be injected into the engine for power augmentation purposes, the valves in the inlet pipe are closed and the valves to the steam pipe are opened so as to permit the flow of steam from the steam source 124. On the other hand, when it is desired to draw hot air from the compressor discharge plenum 208 for injection into the inlet 130, the valves in the steam circuit are closed and the valves to the inlet pipe are opened so as to permit the flow of air from the plenum 208 to the inlet 130.

Figure 3:
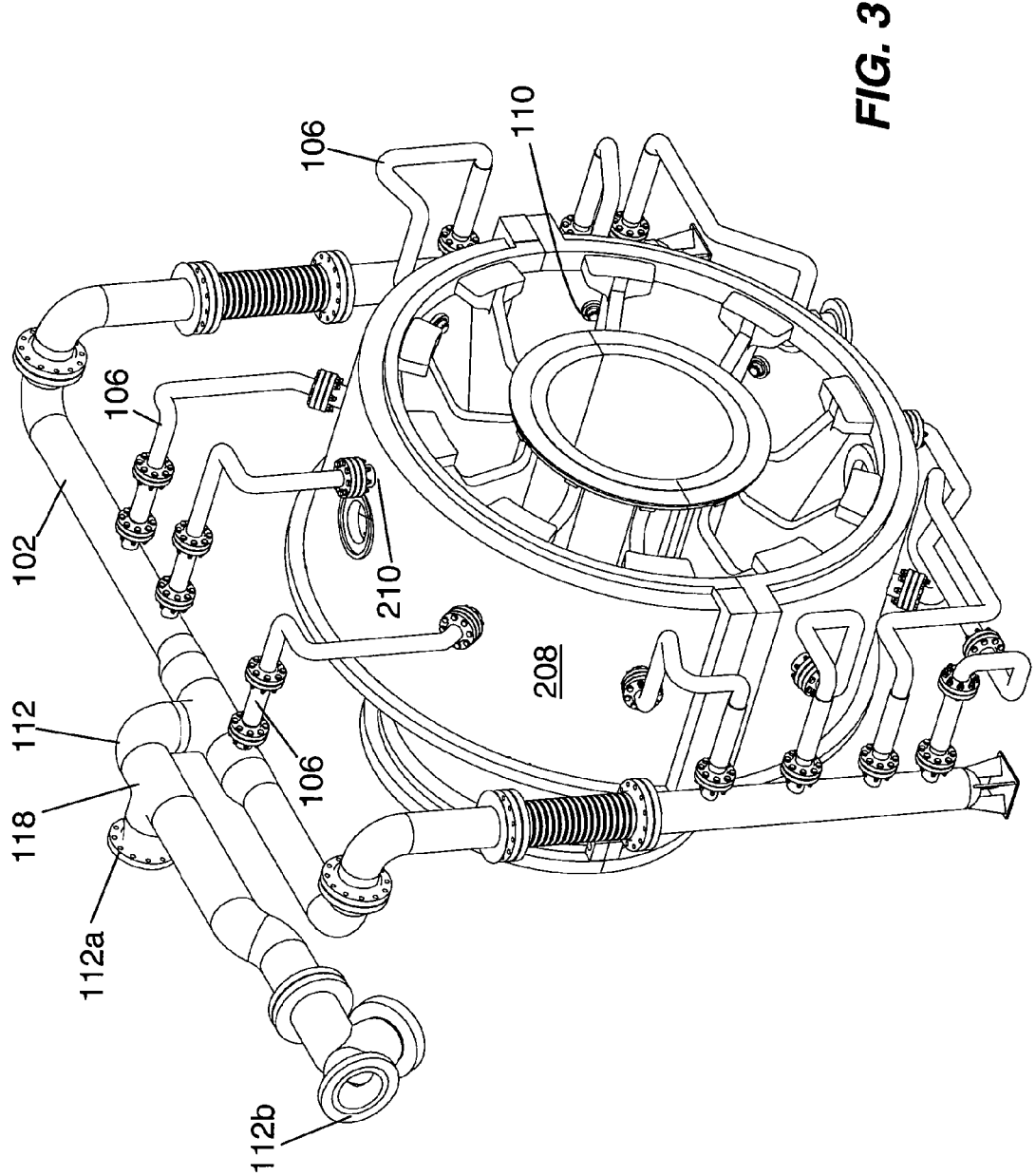
FIG. 3 depicts a perspective view of a portion of a gas turbine engine incorporating an embodiment of the present invention.

The use of a common supply pipe 112 and manifold 102 is more clearly shown in FIG. 3. The supply pipe 112 includes a "T" joint 118 for connecting the supply pipe 112 to two different fluid sources. It is joined to the inlet pipe 116 at a flange 112a and to a steam pipe 114 at a flange 112b. Also shown pictorially in FIG. 3 is the general shape of the manifold 102. As it can be seen, the manifold 102, for this embodiment, has a general inverted U-shape that surrounds a compressor discharge plenum on three sides. It should be understood, that this is merely one of many embodiments for a manifold, and that other manifold configurations are possible without departing from the scope of the invention.

Extending from the manifold 102 is a plurality of feed tubes 106. These feed tubes 106 extend to openings 210 in the plenum 208. These openings are generally equally spaced about the plenum 208 for more even fluid flow distribution. Located proximate an end of the feed tubes 106 and positioned within the plenum 208 is a nozzle 110, which is discussed in more detail below.

Figure 4:
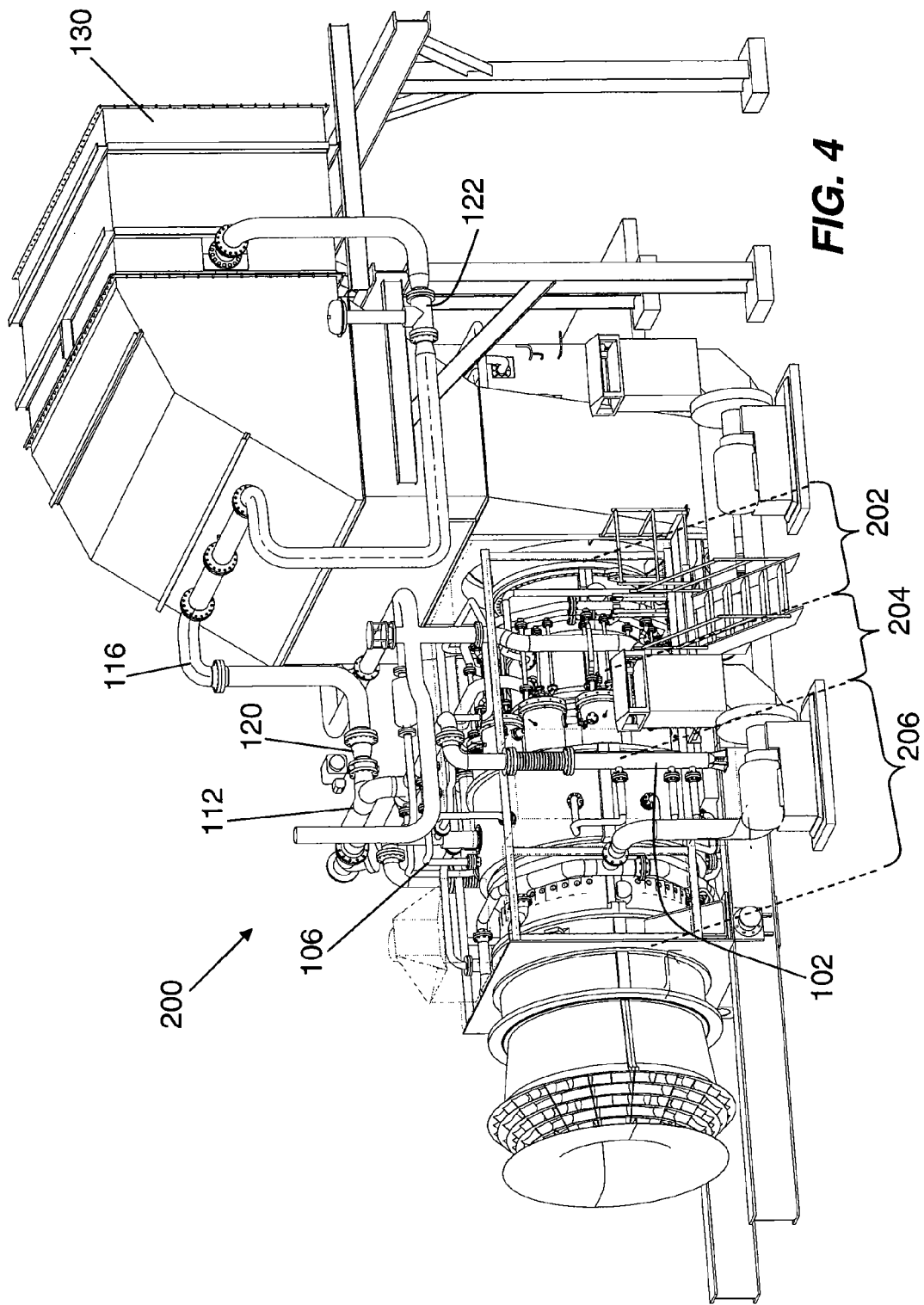
FIG. 4 depicts a perspective view of a gas turbine engine in accordance with an embodiment of the present invention.
Figure 5:
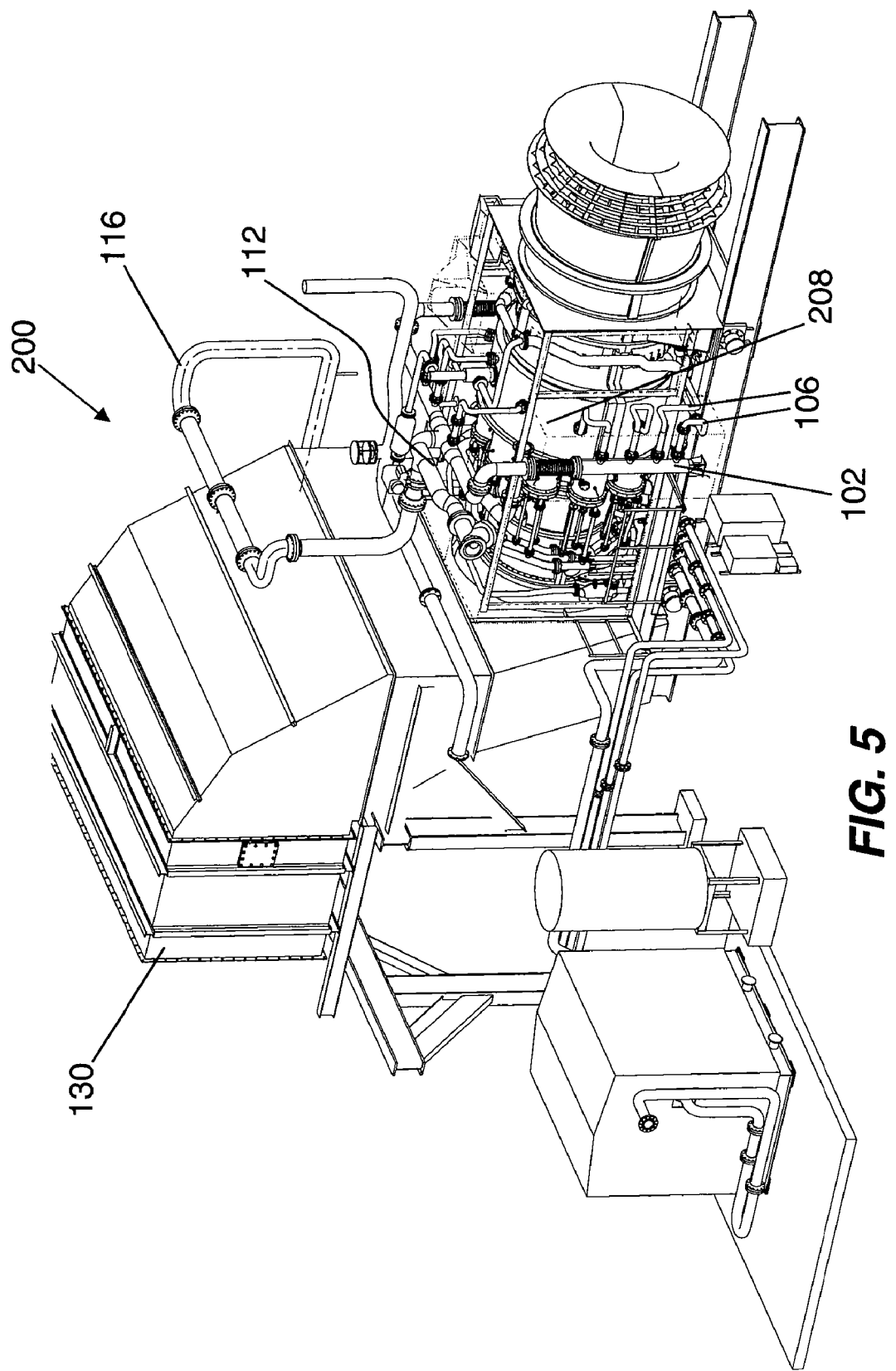
FIG. 5 depicts an alternate perspective view of a gas turbine engine in accordance with an embodiment of the present invention.

In an alternate embodiment, a gas turbine engine 200 is disclosed which utilizes a common inlet bleed heat and steam injection system. FIGS. 4 and 5 disclose the gas turbine engine 200 in greater detail. The core of the engine 200, as previously discussed, comprises a compressor 202, at least one combustor 204, and a turbine 206. These sections of the engine 200 are not clearly visible in FIG. 4, but the general axial locations of these components are indicated. The compressor 202, which as one skilled in the art understands, is generally comprised of alternating rows of stationary and rotating airfoils on a shaft in decreasing radial size so as to compress the air passing through the compressor 202. The compressed air exits the compressor 202 and enters the compressor discharge plenum 208. For the embodiment described herein, the compressor discharge plenum is generally annular in shape, but the shape could vary depending upon the geometry of the engine. The compressed air in the compressor discharge plenum 208 passes to at least one combustor 204 where a mixture of compressed air and fuel reacts to form hot combustion gases. For the embodiment shown in FIGS. 4 and 5, a plurality of can-annular combustors are shown in a generally annular array about the shaft of engine 200. The turbine 206, which also comprises a series of axially spaced stationary and rotating airfoils is in fluid communication with the at least one combustor 204. The turbine converts the hot combustion gases from the combustor into mechanical work to drive the compressor and an electrical generator (not shown), since the compressor 202 is coupled to the turbine 206 by the shaft.

Figure 6:
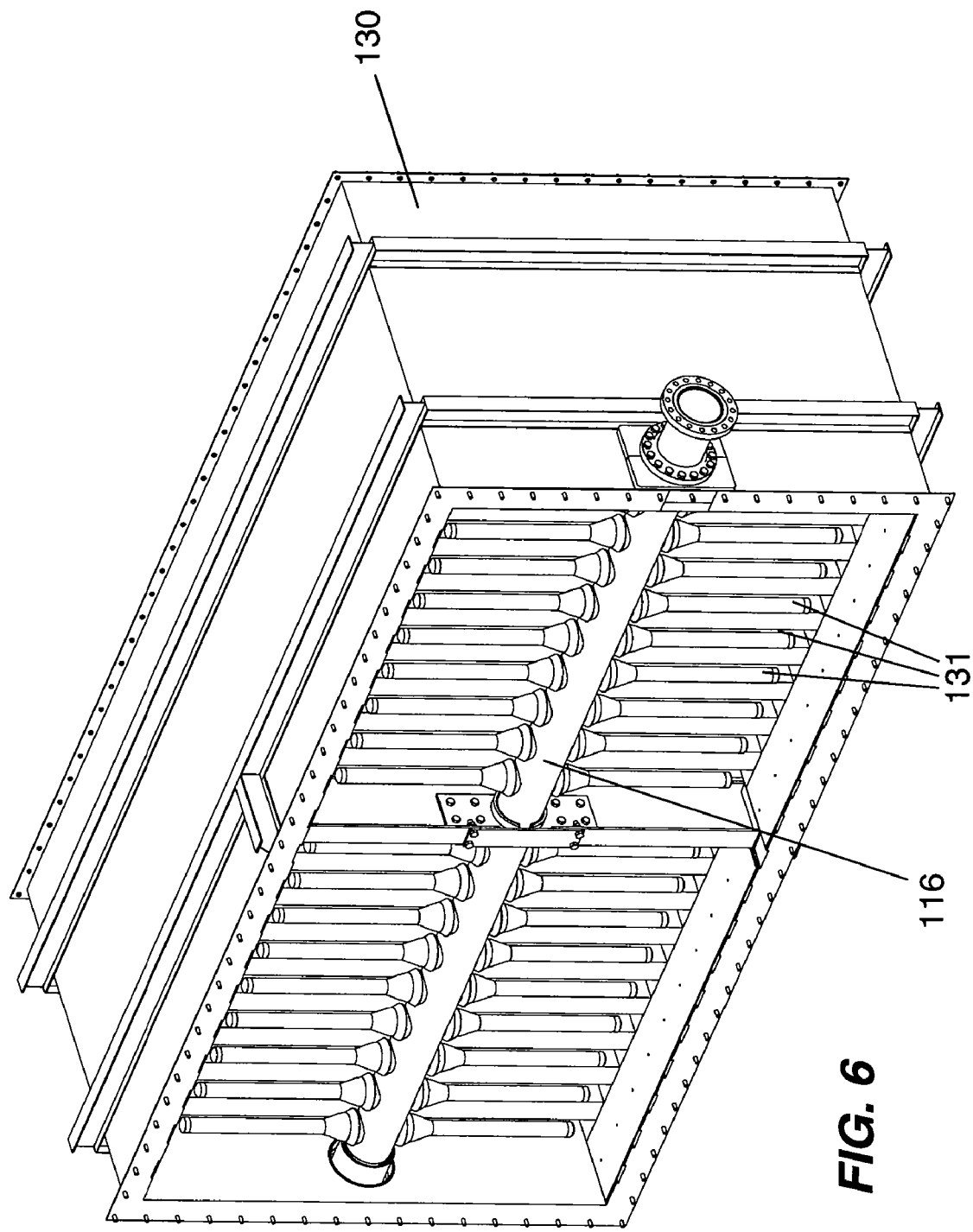
FIG. 6 depicts a perspective view of an inlet section of a gas turbine engine in accordance with an embodiment of the present invention.
Figure 7B:
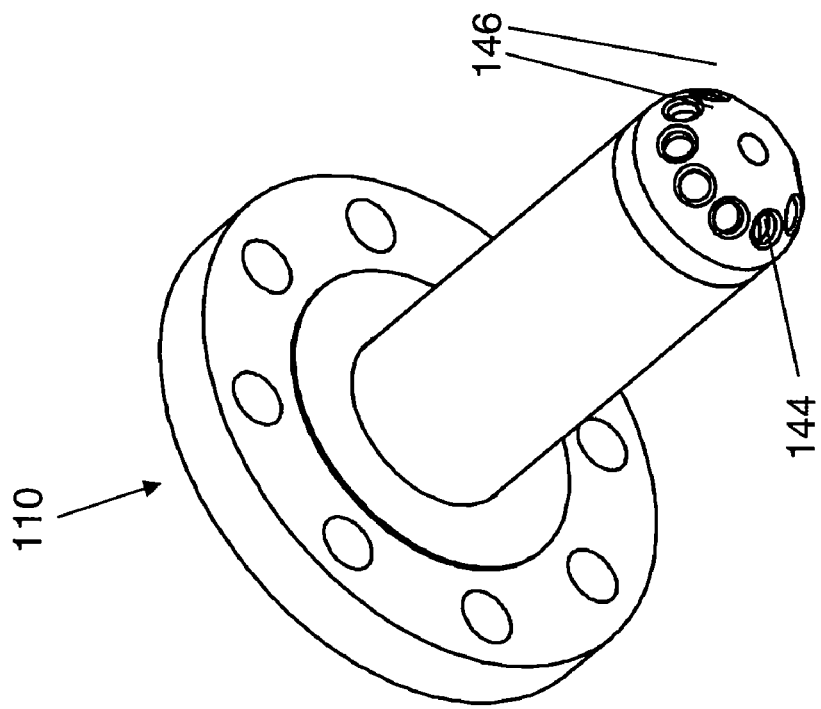
Figure 7A:
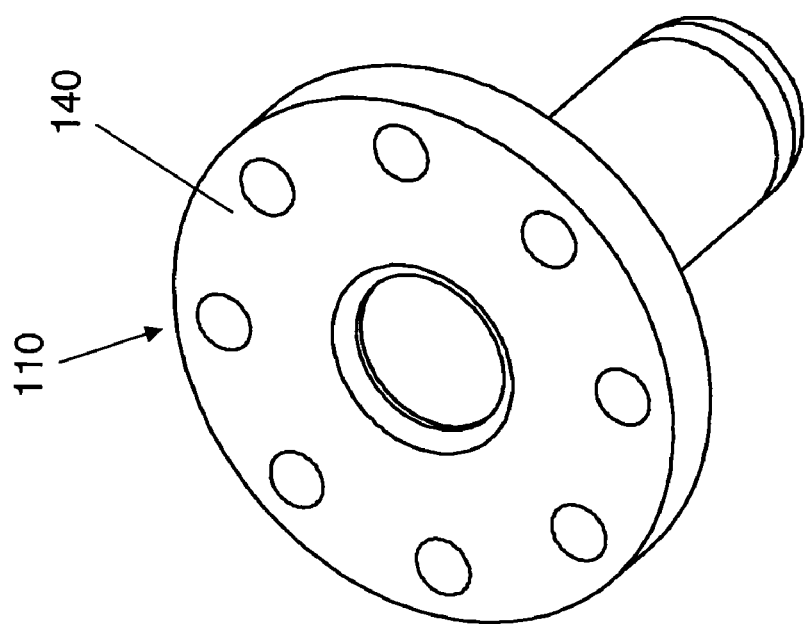

The gas turbine engine 200 also discloses a piping system 100 for bi-directional flow of compressed air for inlet bleed heat and steam injection for power augmentation. With reference to FIGS. 4 and 5, the system 100 is shown positioned on the engine 200 and comprises a manifold 102 having a plurality of feed pipes 106, with the feed pipes 106 being in fluid communication with the manifold 102 and the compressor discharge plenum 208. The piping system for use on the gas turbine engine 200 also comprises a supply pipe 112 which is in fluid communication with the manifold 102. An inlet pipe 116 is coupled to the supply pipe 112 and is in fluid communication with the inlet 130. Located within the inlet pipe 116 for controlling the flow of inlet bleed heat (compressed air) to the inlet 130 is an isolation valve 120 and a control valve 122. As it can be seen from FIGS. 4 and 5, the inlet pipe 116 is in fluid communication with the supply pipe 112 and the manifold 102, such that air drawn from the compressor discharge plenum 208, flows out of the engine through feed tubes 106, through the manifold 102, through the supply pipe 112, and through the inlet pipe 116 to the inlet 130. The air passed to inlet 130 is injected into the incoming ambient air by a plurality of generally vertically extending manifolds 131 that are each in fluid communication with inlet pipe 116 (see FIG. 6). A steam pipe 114 is also coupled to the supply pipe 112, as previously discussed, and although not shown in FIGS. 4 and 5, serves to direct the steam from a steam source into the compressor discharge plenum 208 by way of the supply pipe 112, the manifold 102, and the feed tubes 106.

Another feature of the piping system briefly discussed with respect to FIG. 3 is the nozzle 110 positioned proximate and end of feed tube 106. The nozzle 110 is shown in greater detail in FIGS. 7A-D. The nozzle 110 is positioned proximate an end of the feed tube 106 that is adjacent to the compressor discharge plenum 208 and therefore opposite of the manifold 102. The nozzle 110 is positioned proximate the end of the feed tube 106 by a flange 140 and has an internal passage 142 and an end cap 144. The end cap 144 has a plurality of holes 146 that are positioned and shaped to regulate the flow of fluid through the feed tube 106 in both directions. The holes are shaped so as to meet the flow requirements for two different fluids, compressed air and steam. More specifically, with reference to FIG. 7D, the holes 146 have an opening with a rounded, or blended, edge 148 and an opening with a sharp edge 150, with the sharp-edge opening located on side of hole 146 immediately adjacent the internal passage 142. In the embodiment of the nozzle shown in FIGS. 7B-D, the holes 146 are shown in a general annular array about the end cap 144. However, the hole position could differ depending on the flow requirements such that the holes 146 could be generally perpendicular to the end cap 144.

The function of the nozzle 110 will be better understood when considered in context with the feed tubes 106 and the inlet bleed heat and steam injection piping system 100. When steam is to be injected into the compressor discharge plenum 208, the steam flows in a direction from the manifold 102, through the internal passage 142 of the feed tube 106, and through the sharp-edge openings 150 of the nozzle 110. When compressor discharge air is desired to be bled from the compressor discharge plenum and injected into the inlet, the air flows in a direction from the plenum 208 through the rounded-edge openings 148 in the nozzle 110 and into the feed tube 106 for passage into the manifold 102 and to the inlet 130.

Figure 8:
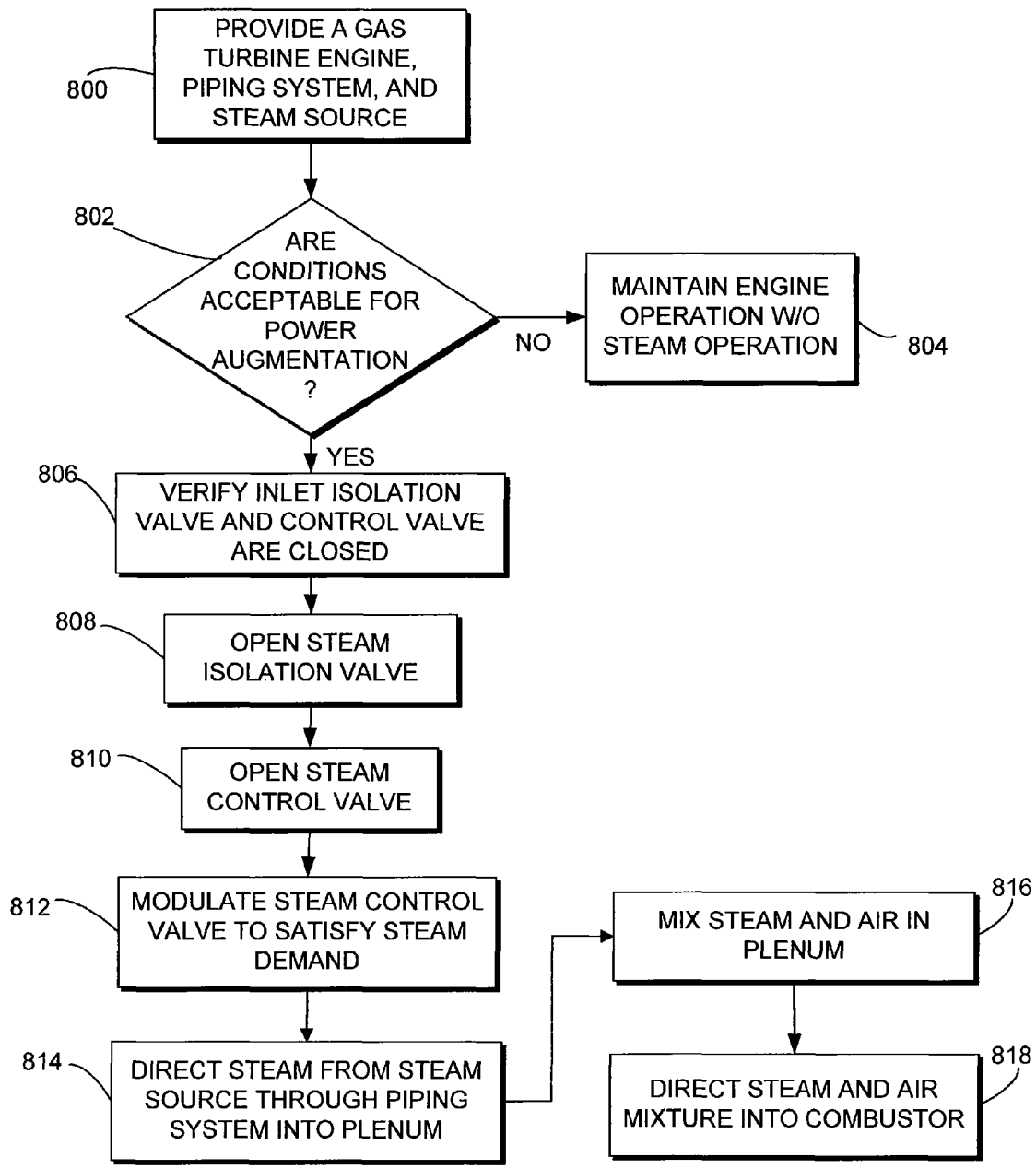
FIG. 8 depicts an illustrative method for providing power augmentation to a gas turbine engine in accordance with an embodiment of the present invention.

Referring now to FIG. 8, a method of providing power augmentation to a gas turbine engine is disclosed. The method comprises in a step 800 providing a gas turbine engine as previously discussed having a compressor for compressing air, at least one combustor for generating hot combustion gases, and a turbine coupled to the compressor for converting the energy received from the combustor into work. Also provided is a piping system as previously discussed. The piping system comprises a manifold, supply pipe coupled to the manifold, a steam pipe coupled to the supply pipe, an isolation valve and control valve in the steam pipe, and an inlet pipe having an isolation valve and control valve. Coupled to the steam pipe is a steam source. In a step 802, a determination is made as to whether or not operating conditions of the gas turbine engine are acceptable for power augmentation via steam injection. If the engine is not operating at approximately 98% load or above, then steam injection is not to be utilized and engine operation is maintained without steam injection in a step 804. However, if the engine is operating at or above 98% load, and steam is available, additional power can be generated through steam injection. In order for the steam to be injected into the compressor discharge plenum, the isolation valve and control valve in the inlet pipe must be closed. These valves are closed prior to achieving base load conditions (above 98% load). These valves must be closed so as to prevent steam from flowing into the engine inlet. The closed valve positions in the inlet pipe are verified in a step 806. In a step 808, the steam isolation valve is opened. As previously discussed the isolation valve has two positions, either fully open or fully closed. In a step 810 the steam control valve is opened to release the flow of steam from the steam source to the piping system, and ultimately the compressor discharge plenum. Unlike the isolation valve, the steam control valve can be modulated in a step 812 in order to satisfy the steam demand. In a step 814, the steam flow is directed from the steam source through the piping system and into the compressor discharge plenum. In a step 816, the steam and air mix in the compressor discharge plenum and the mixture is then directed into a combustor in a step 818.

Figure 9:
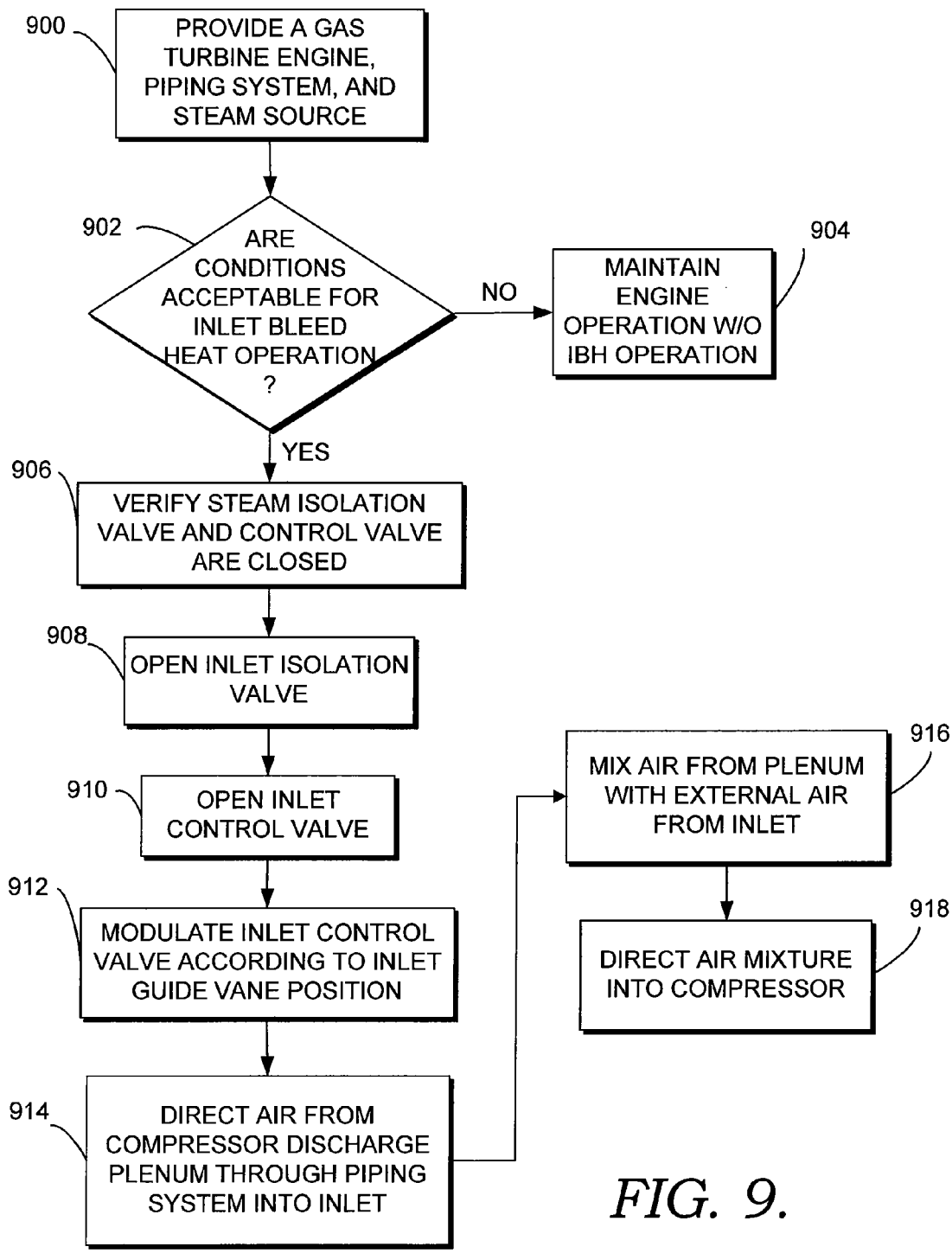
FIG. 9 depicts an illustrative method for providing heated compressed air to a gas turbine engine in accordance with an embodiment of the present invention.

Referring now to FIG. 9, a method of providing hot compressed air to a gas turbine engine inlet is disclosed. The method comprises in a step 900 providing a gas turbine engine as previously discussed having a compressor for compressing air, at least one combustor for generating hot combustion gases, and a turbine coupled to the compressor for converting the energy received from the combustor into work. Also provided is a piping system as previously discussed. The piping system comprises a manifold, supply pipe coupled to the manifold, a steam pipe coupled to the supply pipe, an isolation valve and control valve in the steam pipe, and an inlet pipe having an isolation valve and control valve. Coupled to the steam pipe is a steam source. In a step 902, a determination is made whether or not engine operating conditions are acceptable for inlet bleed heat operation. Acceptable operating conditions typically correspond to approximately 95% operating speed to approximately 75% load. If conditions are not acceptable, then the engine operation is maintained, without inlet bleed heat operation, at a step 904. The amount of airflow passing from the inlet to the compressor will determine if inlet bleed heat can be utilized. As one skilled in the art will understand, the mass flow of air to the compressor is determined by the inlet guide vanes that are positioned in the engine inlet. The inlet guide vanes modulate in position from fully open to partially closed. A closing of the inlet guide vanes restricts the flow of ambient air into the inlet. That is, once the turbine reaches a desired operating speed, which for a 60 Hz cycle machine is approximately 3510 rpm, the inlet guide vanes close from approximately 57 degrees to approximately 48 degrees, thereby reducing the airflow passing through the engine inlet. It is under these conditions that less air is provided to the compressor and inlet bleed heat can be utilized. When compressed air from the compressor discharge plenum is injected into the inlet the average temperature of the compressed air entering the combustor is higher, and therefore, combustor operation can be maintained in a more efficient mode (i.e. premix).

In a step 906, the isolation valve and control valve in the steam pipe are verified to be in a closed position, such that hot compressed air does not travel towards or into the steam source. As with the inlet bleed heat function, the steam isolation and control valves are closed prior to achieving a speed/load condition at which inlet bleed heat can be utilized. In a step 908, the isolation valve in the inlet pipe is opened. As previously discussed the isolation valve has two positions, either fully open or fully closed. In a step 910, the control valve of the inlet pipe is opened. This opens the circuit established between the compressor discharge plenum and the inlet. In a step 912, the inlet control valve can be modulated so as to adjust the amount of airflow passing through the valve. The amount of air passing through the control valve is approximately 5% of total compressor flow. In a step 914, the compressed air drawn from the compressor discharge plenum is directed through the piping system to the inlet. In a step 916, the air from the plenum is mixed with the ambient air entering the inlet and in a step 918, this air mixture is directed to the compressor.

Once the land-based gas turbine engine/generator system reaches an operating speed of 95%, or approximately 3510 rpm for the embodiment disclosed herein, the breaker can be closed between the generator and the grid. As discussed briefly in step 912, the position of the inlet control valve varies. As load on the engine increases, the inlet guide vanes will open in order to increase airflow to control engine exhaust temperature. The inlet bleed heat control valve gradually closes as a function of inlet guide vane angle. That is, as the load on the engine increases, the inlet guide vane angle increases and the inlet control valve continues to close. When the inlet guide vanes are fully open, the inlet isolation valve and inlet control valve are closed so as to stop the flow of compressor discharge air to the engine inlet. Should load decrease and the inlet guide vanes close to control exhaust temperature, the inlet valves can open again to bleed hot compressed air into the engine inlet, if inlet bleed heat is still desired.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. An inlet bleed heat and steam injection system comprising:
    a manifold extending about at least a portion of a gas turbine engine;
    a plurality of feed pipes in fluid communication with the manifold and a compressor discharge plenum of the engine;
    a supply pipe in fluid communication with the manifold;
    a steam pipe coupled to the supply pipe and in fluid communication with a steam source, the steam pipe having a steam isolation valve and a steam control valve; and,
    an inlet pipe coupled to the supply pipe and in fluid communication with an inlet to the engine, the inlet pipe having an inlet bleed heat isolation valve and an inlet bleed heat control valve.

2. The system of claim 1 wherein the manifold extends in a general U-shape about a portion of the engine.

3. The system of claim 1 wherein the compressor discharge plenum has a plurality of openings generally equally spaced about the plenum for receiving the feed pipes.

4. The system of claim 3 wherein each of the feed pipes contain a nozzle proximate the openings in the plenum.

5. The system of claim 4 wherein the nozzle includes a plurality of injection holes with each hole having one rounded edge.

6. The system of claim 1 wherein the steam pipe further comprises an orifice plate, a plurality of drain valves, and at least one thermocouple.

7. The system of claim 1 wherein the inlet pipe further comprises one or more drain valves and at least one thermocouple.

8. The system of claim 1 wherein steam can flow from the steam source through the steam pipe to the supply pipe and to the compressor discharge plenum when the valves in the inlet pipe are closed.

9. The system of claim 1 wherein compressed air can flow from the compressor discharge plenum through the supply pipe and through the inlet pipe to the engine inlet when the valves in steam pipe are closed.

10. A gas turbine engine comprising:
an air inlet;
a compressor in fluid communication with the inlet, the compressor for compressing air from the inlet;
a compressor discharge plenum;
at least one combustor for generating hot combustion gases in fluid communication with the compressor discharge plenum;
a turbine in fluid communication with the at least one combustor, the turbine for converting the hot combustion gases into mechanical work to drive the compressor and an electrical generator, which are coupled to the turbine by a shaft;
a bi-directional flowing pipe system comprising:
a manifold having a plurality of feed pipes in fluid communication therewith, the feed pipes also in fluid communication with the compressor discharge plenum;
a supply pipe in fluid communication with the manifold;
a steam pipe coupled to the supply pipe and in fluid communication with a steam source, the steam pipe having a steam isolation valve and a steam control valve; and,
an inlet pipe coupled to the supply pipe and in fluid communication with the inlet, the inlet pipe having an inlet bleed heat isolation valve and an inlet bleed heat control valve.

11. The gas turbine engine of claim 10 wherein the at least one combustor comprises a plurality of combustors in an annular array about the engine shaft.

12. The gas turbine engine of claim 10 further comprising a nozzle positioned proximate an end of each feed pipe and adjacent the compressor discharge plenum.

13. The gas turbine engine of claim 12 wherein the nozzle includes a plurality of injection holes with each hole having one edge rounded.

14. The gas turbine engine of claim 10 wherein the steam pipe further comprises an orifice plate, a plurality of drain valves, and at least one thermocouple.

15. The gas turbine engine of claim 10 wherein the inlet pipe further comprises one or more drain valves and at least one thermocouple.

16. The gas turbine engine of claim 10 wherein when the inlet bleed heat valves are closed and the steam valves are open, steam can flow through the steam pipe to the supply pipe, the feed pipes, and into the compressor discharge plenum.

17. The gas turbine engine of claim 10 wherein when the steam valves are closed and the inlet bleed valves are open, air can flow from the compressor discharge plenum through the feed pipes, the supply pipe, and the inlet pipe into the inlet.

18. The gas turbine engine of claim 17 wherein the air injected into the inlet is injected by a plurality of generally vertically extending manifolds.

19. A method of providing heated compressed air to a gas turbine engine inlet comprising:
providing a gas turbine engine comprising a compressor for compressing air, at least one combustor for generating hot combustion gases, and a turbine coupled to the compressor for converting the energy from the combustor into work;
providing a piping system comprising a manifold, a supply pipe coupled to the manifold, a steam pipe coupled to the supply pipe, the steam pipe having a steam isolation valve and a steam control valve, and an inlet pipe coupled to the supply pipe, the inlet pipe having an inlet bleed heat isolation valve and an inlet bleed heat control valve;
providing a steam source to the gas turbine engine;
closing a control valve and isolation valve in a steam pipe;
opening a control valve and isolation valve in an inlet pipe such that heated compressed air from the compressor discharge plenum flows through the feed tubes to the manifold, the supply pipe, and the inlet pipe to the inlet;
mixing the heated compressed air received from the compressor discharge plenum with external air drawn into the inlet; and
directing the air mixture through the inlet and into the compressor.

20. The method of claim 19 wherein the control valve in the inlet pipe is adjustable and its position will vary depending on the amount of air required to be injected into the inlet.

21. The method of claim 19 wherein providing heated compressed air to the inlet is permitted at engine load conditions of approximately 95% operating speed to approximately 75% of baseload.

22. A method of providing power augmentation to a gas turbine engine comprising:
providing a gas turbine engine comprising a compressor for compressing air, at least one combustor for generating hot combustion gases, and a turbine coupled to the compressor for converting the energy from the combustor into work;
providing a piping system comprising a manifold, a supply pipe coupled to the manifold, a steam pipe coupled to the supply pipe, the steam pipe having a steam isolation valve and a steam control valve, and an inlet pipe coupled to the supply pipe, the inlet pipe having an inlet bleed heat isolation valve and an inlet bleed heat control valve;
providing a steam source to the gas turbine engine;
closing the control valve and isolation valve in the inlet pipe;
opening the control valve and isolation valve in the steam pipe such that steam from the steam source flows from the steam source through the steam pipe to a supply pipe, to a manifold, and through a plurality of feed tubes to a compressor discharge plenum;
mixing the steam and air from the compressor in the compressor discharge plenum;
flowing the steam and air from the compressor discharge plenum through the at least one combustor so as to provide additional working fluid at a lower reaction temperature, thereby increasing the engine output.

23. The method of claim 22 wherein the control valve in the steam pipe is adjustable and its position will vary depending on the amount of steam required to be injected into the compressor discharge plenum.

24. The method of claim 22 wherein providing power augmentation occurs only when the engine is operating at a full load condition.

* * * * *